United States Patent
Park et al.

(10) Patent No.: US 11,410,304 B2
(45) Date of Patent: Aug. 9, 2022

(54) METHOD AND APPARATUS FOR RAPID DIAGNOSIS OF HEMATOLOGIC MALIGNANCY USING 3D QUANTITATIVE PHASE IMAGING AND DEEP LEARNING

(71) Applicant: TOMOCUBE, INC., Yuseong-gu Daejeon (KR)

(72) Inventors: YongKeun Park, Daejeon (KR); Donghun Ryu, Daejeon (KR); Young Seo Kim, Daejeon (KR); Kihyun Hong, Yuseong-gu Daejeon (KR); Hyun-Seok Min, Yuseong-gu Daejeon (KR)

(73) Assignee: TOMOCUBE, INC., Daejeon (KR)

( * ) Notice: Subject to any disclaimer, the term of this patent is extended or adjusted under 35 U.S.C. 154(b) by 0 days.

(21) Appl. No.: 16/900,364

(22) Filed: Jun. 12, 2020

(65) Prior Publication Data

US 2020/0394794 A1 Dec. 17, 2020

(30) Foreign Application Priority Data

Jun. 14, 2019 (KR) .......................... 10-2019-0070491

(51) Int. Cl.
*G06T 7/00* (2017.01)
*G06T 7/11* (2017.01)
(Continued)

(52) U.S. Cl.
CPC ............ *G06T 7/0012* (2013.01); *G01B 9/021* (2013.01); *G01N 21/453* (2013.01); *G06T 7/11* (2017.01);
(Continued)

(58) Field of Classification Search
CPC . G06T 7/0012; G06T 7/11; G06T 7/74; G06T 2207/20076; G06T 2207/20081;
(Continued)

(56) References Cited

U.S. PATENT DOCUMENTS

2006/0093200 A1* 5/2006 Sharpe ............... G01N 21/6458
382/131
2018/0211380 A1* 7/2018 Tandon ................ G06K 9/6271

FOREIGN PATENT DOCUMENTS

| KR | 10-2001-0017092 | 3/2001 |
| KR | 10-2016-0012758 | 2/2016 |
| KR | 101805152 B1 | 12/2017 |

OTHER PUBLICATIONS

Yoon et al. "Label-free Characterization of White Blood Cells by Measuring 3D Refractive Index Maps." Biomedical Optics Express, vol. 6, No. 10, Oct. 1, 2015, pp. 3865-3875 (Year: 2015).*

(Continued)

*Primary Examiner* — Jon Chang
(74) *Attorney, Agent, or Firm* — Heslin Rothenberg Farley & Mesiti P.C.

(57) ABSTRACT

A non-label diagnosis apparatus for a hematologic malignancy may include a 3-D refractive index cell imaging unit configured to generate a 3-D refractive index slide image of a blood smear specimen by capturing a 3-D refractive index image in the form of the blood smear specimen in which blood (including a bone-marrow or other body fluids) of a patient has been smeared on a slide glass, an ROI detection unit configured to sample a suspected cell segment in the blood smear specimen based on the 3-D refractive index slide image and to determine, as ROI patches, cells determined as abnormal cells, and a diagnosis unit configured to determine a sub-classification of a cancer cell corresponding to each of the ROI patches using a cancer cell sub-classification determination model constructed based on a deep learning algorithm and to generate hematologic malignancy diagnosis results by gathering sub-classification results of the ROI patches.

10 Claims, 8 Drawing Sheets

(51) Int. Cl.
*G06T 7/73* (2017.01)
*G01B 9/021* (2006.01)
*G01N 21/45* (2006.01)

(52) U.S. Cl.
CPC ...... *G06T 7/74* (2017.01); *G06T 2207/20076* (2013.01); *G06T 2207/20081* (2013.01); *G06T 2207/20084* (2013.01); *G06T 2207/20221* (2013.01); *G06T 2207/30024* (2013.01)

(58) Field of Classification Search
CPC . G06T 2207/20084; G06T 2207/20221; G06T 2207/30024; G01B 9/021; G01N 21/453
See application file for complete search history.

(56) References Cited

OTHER PUBLICATIONS

Bjelkhagen et al. "High-Resolution Contact Denisyuk Holography." Applied Optics, vol. 31, No. 8, Mar. 10, 1992, pp. 1041-1047 (Year: 1992).*

Kyoohyun Kim et al.; Optical Diffraction Tomography Techniques For The Study Of Cell Pathophysiology; Department of Physics, Korea Advanced Institute of Science and Technology (KAIST), Daejeon 34141, Republic of Korea; 2KAIST Institute of Health Science and Technology, Daejeon 34141, Republic of Korea; 3Department of Biological Sciences, KAIST, Daejeon 34141, Republic of Korea; 4TOMOCUBE, Inc., Daejeon 34141, Republic of Korea; pp. 1-16, (2016).

Emil Wolf; Three-Dimensional Structure Determination Of Semi-Transparent Objects From Holographic Data; Optics Communications; vol. 1, Issue 4, Sep.-Oct. 1969, pp. 153-156, (abstract only).

\* cited by examiner

METHOD AND APPARATUS FOR RAPID DIAGNOSIS OF HEMATOLOGIC MALIGNANCY USING 3D QUANTITATIVE PHASE IMAGING AND DEEP LEARNING

CROSS REFERENCE TO RELATED APPLICATIONS

This application claims priority under 35 U.S.C. § 119 to Korean Patent Application No. 10-2019-0070491 filed on Jun. 14, 2019, which is incorporated herein by reference in its entirety.

BACKGROUND OF THE INVENTION

1. Technical Field

The following embodiments relate to a non-label method and apparatus for rapidly and accurately diagnosing a hematologic malignancy including leukemia and the lymphoma without an additional process, such as dyeing or a label, using three-dimensional (3-D) quantitative phase imaging and deep learning.

2. Description of the Related Art

Acute leukemia is a disease having a different treatment method and prognosis depending on a subtype. For example, it has been known that acute promyelocytic leukemia (APL) belongs to a high risk group having the early mortality of 10% or more due to complications, such as intracranial hemorrhage. However, it also has been known that APL has a good prognosis compared to another acute myeloid leukemia (AML) if treatment is early performed using a complex anticancer therapy based on antracycline along a targeted agent all-trans retinoic acid (ATRA). Accordingly, in order to increase a treatment effect of acute leukemia and reduce the morality, the rapid diagnosis and determination of acute leukemia are important. Another representative example includes lymphoma, that is, a hematologic malignancy occurring in a lymph node of the human body. The lymphoma may occur in any organ, and it resultantly also penetrates a bone-marrow and has a symptom similar to that of leukemia. Minute diagnosis and determination is necessary for the lymphoma because the type of lymphoma is very various. In general, a morphological test, a cytochemical test, an immuno-expression type test, a cytogenetic test, or a molecular genetic test is used to diagnose and determine acute leukemia. The morphological test is a method of morphologically determining a blood smear (e.g., including peripheral blood or bone-marrow puncture), a biopsy or a fragment based on the characteristics of a dyed cell by performing Wright dyeing or H&E dyeing and calculating a cell count (or including a cell ratio and cell faithfulness). Accordingly, the morphological test has fundamental problems in that time and costs are necessary for the dyeing process, the deformation of a cell is inevitable due to the dyeing process, and the test is subjective and not constant because it is based on experiences and state of a user. Furthermore, in order to determine acute leukemia, an immuno-expression type test, a cytogenetic test (e.g., karyotyping, fluorescence in-situ hybridization (FISH)) and a molecular genetic test (e.g., RT-PCR) must be additionally performed. The immuno-expression type test is a method of detecting a cancer cell using an antibody combined with an antigen specific in the cancer cell. A specific cancer cell may be detected and determined by attaching a fluorescent material or a magnetic material to the antibody. However, such an additional test increases not only overall test costs, but the time taken to diagnose and determine acute leukemia. Accordingly, the diagnosis and treatment of a subtype of acute leukemia that requires rapid treatment is inevitably delayed.

PRIOR ART TECHNICAL DOCUMENT

Non-Patent Document (Non-Patent Document 1) Kim, K., et al. (2016). "Optical diffraction tomography techniques for the study of cell pathophysiology." arXiv preprint arXiv:1603.00592.
(Non-Patent Document 2) Wolf, E. (1969). "Three-dimensional structure determination of semi-transparent objects from holographic data." Optics Communications 1(4): 153-156.

SUMMARY OF THE INVENTION

Embodiments describe a rapid and non-label diagnosis method and apparatus for a hematologic malignancy using three-dimensional (3-D) quantitative phase imaging and deep learning, and more specifically, provide a technology for rapidly and accurately diagnosing and analyzing a hematologic malignancy, including leukemia and the lymphoma, without an additional process such as dyeing or a label.

Embodiments provide a rapid and non-label diagnosis method and apparatus for a hematologic malignancy including leukemia and the lymphoma by measuring the 3-D refractive index for the morphological characteristics of a cancer cell without dyeing or a label and applying a deep learning algorithm for the detailed classification and diagnosis of a cancer cell.

In an embodiment, a non-label diagnosis apparatus for a hematologic malignancy using 3-D quantitative phase imaging and deep learning may include a 3-D refractive index cell imaging unit configured to generate a 3-D refractive index slide image of a blood smear specimen by capturing a 3-D refractive index image in a form of the blood smear specimen in which blood (including a bone-marrow and including other body fluids) of a patient has been smeared on a slide glass or in a form in which the 3-D refractive index slide image has a single layer, a region-of interest (ROI) detection unit configured to sample a suspected cell segment in the blood smear specimen based on the 3-D refractive index slide image and to determine, as ROI patches, cells determined as abnormal cells, and a diagnosis unit configured to determine a sub-classification of a cancer cell corresponding to each of the ROI patches using a cancer cell sub-classification determination model constructed based on a deep learning algorithm and to generate hematologic malignancy diagnosis results by gathering subclassification results of the ROI patches.

The apparatus may further include a light source configured to have light incident on the blood smear specimen, an interferometer configured to obtain multiple 2-D holograms by measuring transmitted light diffracted from the blood smear specimen, and a measurement unit configured to measure a 3-D refractive index distribution of the blood smear specimens using the multiple 2-D holograms. The 3-D refractive index distribution of the blood smear specimens is measured using the multiple 2-D holograms, measured by the interferometer, by rotating an angle of the light incident on the blood smear specimens.

The 3-D refractive index cell imaging unit may include a 3-D patch image capturing unit configured to capture 3-D refractive index images capable of being captured simultaneously in the form of the blood smear specimen in which the blood has been smeared on the slide glass and a patch image connector configured to generate the 3-D refractive index slide image by connecting the 3-D refractive index images captured simultaneously.

The ROI detection unit may include a cell region extraction unit configured to extract the suspected cell segment from the 3-D refractive index slide image, that is, a 3-D refractive index image of all of the blood smear specimens, a cell patch sampling unit configured to generate a patch by sampling the extracted suspected cell segment, and an ROI determination unit configured to determine, as the ROI patches, the cells determined as the abnormal cells.

The diagnosis unit may evaluate quality of the specimen by gathering subclassification results of the ROI patches and generate the hematologic malignancy diagnosis results including the number of cancer cells for each sub-classification [a cell ratio (percentage, M/E ratio), cell faithfulness, tumor burden].

The cancer cell sub-classification determination model may determine the sub-classification of the cancer cell corresponding to each ROI patch by merging results of the deep learning algorithm to which the measured 3-D refractive index image has been input based on a probability.

In another embodiment, a non-label diagnosis method for a hematologic malignancy using 3-D quantitative phase imaging and deep learning may include generating a 3-D refractive index slide image of a blood smear specimen by capturing a 3-D refractive index image in a form of the blood smear specimen in which blood of a patient has been smeared on a slide glass, sampling a suspected cell segment in the blood smear specimen based on the 3-D refractive index slide image, determining, as ROI patches, cells determined as abnormal cells, determining a subclassification of a cancer cell corresponding to each of the ROI patches using a cancer cell sub-classification determination model constructed based on a deep learning algorithm, generating hematologic malignancy diagnosis results by gathering subclassification results of the ROI patches.

Generating the 3-D refractive index slide image of the blood smear specimen may include capturing 3-D refractive index images capable of being captured simultaneously in the form of the blood smear specimen in which the blood has been smeared on the slide glass, and generating the 3-D refractive index slide image by connecting the 3-D refractive index images captured simultaneously.

Generating the hematologic malignancy diagnosis results by gathering the sub-classification results of the ROI patches may include generating the hematologic malignancy diagnosis results including a number of cancer cells for each sub-classification by gathering sub-classification results of the ROI patches. In this case, the cancer cell sub-classification determination model may determine the sub-classification of the cancer cell corresponding to each ROI patch by merging results of the deep learning algorithm to which the measured 3-D refractive index image has been input based on a probability.

DETAILED DESCRIPTION

Figure 1:
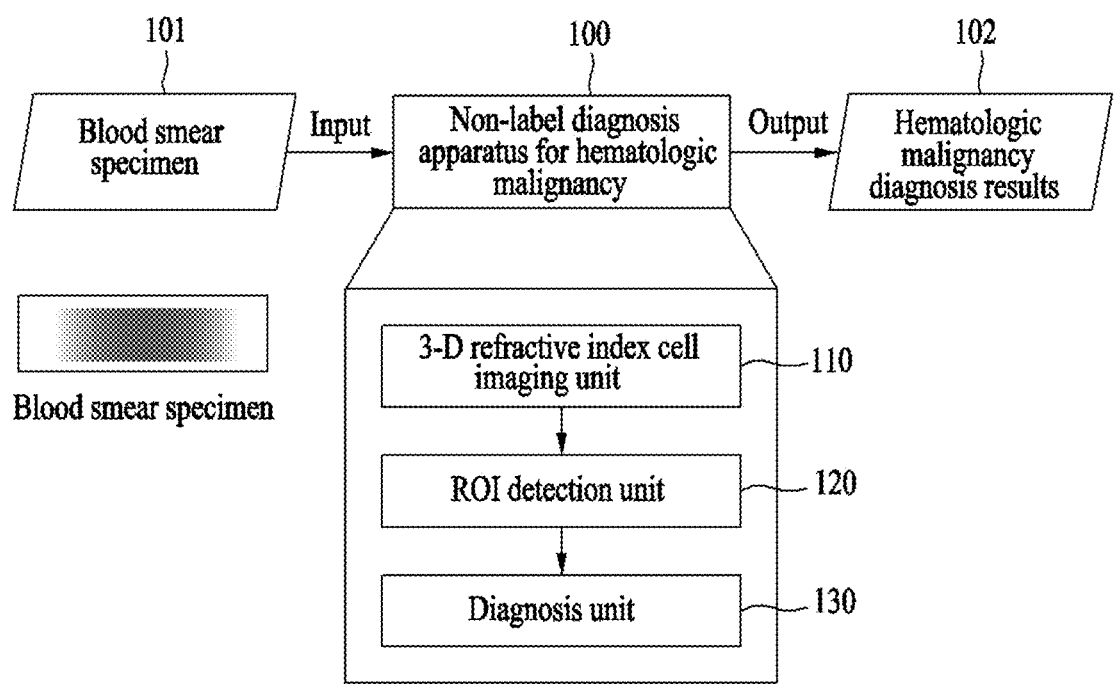
FIG. 1 is a block diagram for describing a rapid and non-label diagnosis apparatus for a hematologic malignancy using three-dimensional (3-D) quantitative phase imaging and deep learning according to an embodiment.

Hereinafter, embodiments are described in detail with reference to the accompanying drawings. However, the described embodiments may be modified in various other forms, and the scope of the present disclosure is not restricted by the following embodiments. Furthermore, the embodiments of the present disclosure are provided to fully describe the present disclosure to a person having ordinary knowledge in the art to which the present disclosure pertains. The shapes, sizes, etc. of elements in the drawings may be exaggerated for a clear description.

The following embodiments relate to a technology for rapidly and accurately diagnosing and analyzing a hematologic malignancy, including leukemia (including acute leukemia) and lymphoma, without an additional process such as dyeing or a label, and may provide a technology for determining a subtype of a hematologic malignancy that requires rapid treatment by determining a sub-type of a cancer cell using the measurement of the 3-D refractive index of a live cancer cell never using dyeing or a label.

The type of a cancer cell related to a hematologic malignancy can be simply and accurately determined by measuring the 3-D refractive index of a cell and applying a deep learning algorithm to the analysis of the measured value. A distribution of 3-D refractive indices within a cell is closely related to the configuration and shape of a subcellular organelle within a cell. Furthermore, a refractive index value itself is proportional to a concentration of proteins, that is, major constituent elements within a cell. Accordingly, to measure information on the 3-D refractive indices of a cell includes generating data into which biochemical characteristic information has been incorporated in addition to the cell and the morphological characteristics of a subcellular organelle within the cell. Accordingly, if the 3-D refractive index distribution is used, the sub-type of a cancer cell can be determined based on morphological and biochemical characteristics specific to the type of cancer cell. Rapid diagnosis can be provided without using dyeing and a label, which may affect time and diagnosis performance consistency, based on the determination and analysis results of the sub-type of a cancer cell.

FIG. 1 is a block diagram for describing a rapid and non-label diagnosis apparatus 100 for a hematologic malignancy using three-dimensional (3-D) quantitative phase imaging and deep learning according to an embodiment.

Referring to FIG. 1, the rapid and non-label diagnosis apparatus 100 for a hematologic malignancy using 3-D quantitative phase imaging and deep learning according to an embodiment may receive a blood smear specimen (including a biopsy and a sliced slide) 101 smeared from blood (including a bone-marrow and other body fluids) of a patient, and may output the hematologic malignancy diagnosis results 102 of the patient. The rapid and non-label diagnosis apparatus 100 for a hematologic malignancy using 3-D quantitative phase imaging and deep learning according to an embodiment may include a 3-D refractive index cell imaging unit 110, a region-of-interest (ROI) detection unit 120, and a diagnosis unit 130.

The 3-D refractive index cell imaging unit 110 may generate a 3-D refractive index slide image of the blood smear specimen 101 by capturing a 3-D refractive index image in the form of the blood smear specimen 101 in which blood of a patient has been smeared on a slide glass or in a form in which the 3-D refractive index slide image has a single layer or a plurality of layers (multiple layers) on an in vitro slide glass. More specifically, the 3-D refractive index cell imaging unit 110 may include a 3-D patch image capturing unit and a patch image connector. The 3-D patch image capturing unit may capture 3-D refractive index images capable of being captured simultaneously in the form of the blood smear specimen 101 in which the blood has been smeared on a slide glass. The patch image connector may generate a 3-D refractive index slide image by connecting the 3-D refractive index images captured simultaneously.

The 3-D refractive index cell imaging unit 110 may include a light source, an interferometer, and a measurement unit.

The light source may have light incident on the blood smear specimen 101. That is, the light source may radiate light to the blood smear specimen 101 (i.e., cell). For example, a laser may be used as the light source. The light source may radiate a laser beam to a sample, such as the blood smear specimen 101 to be measured. In this case, the blood smear specimen 101 may be presented as a sample, that is, a target to be measured. The blood smear specimen 101 includes a bone-marrow and other body fluids in addition to blood, and may include a cell or a microorganism. A single wavelength laser may be used as the light source. Furthermore, the light source may be used to determine a cell based on a larger amount of information by measuring 3-D refractive indices in each wavelength through a multi-wavelength laser.

The interferometer may obtain multiple 2-D holograms by measuring transmitted light diffracted from the blood smear specimen 101 after light input from the light source is incident on the blood smear specimen 101. In this case, the interferometer is a measuring instrument using the interference phenomenon of light, and is an instruction for dividing light, emitted from the same light source, into two or more bundles so that the pieces of light have different paths and then monitoring an interference phenomenon occurring when the pieces of light are met again.

The measurement unit may measure a 3-D refractive index distribution of the blood smear specimen 101 using the multiple 2-D holograms obtained by the interferometer. For example, a camera, that is, a photographing device for capturing an image, may be used as the measurement unit.

The 3-D refractive index cell imaging unit 110 may measure a 3-D refractive index distribution of the blood smear specimen 101 through any one optical measurement among an optical diffraction tomography and an optical projection tomography. The 3-D refractive index cell imaging unit 110 may rotate the angle of light incident from the blood smear specimen 101, and may measure a 3-D refractive index distribution of the blood smear specimen 101 using the multiple 2-D holograms measured by the interferometer. Furthermore, the 3-D refractive index cell imaging unit 110 may directly rotate the blood smear specimen 101, and may measure a 3-D refractive index distribution of the blood smear specimen 101 using the multiple 2-D holograms measured by the interferometer.

The ROI detection unit 120 may sample a suspected cell segment from the blood smear specimen 101 based on the 3-D refractive index slide image, and may determine, as ROI patches, cells determined as abnormal cells. More specifically, the ROI detection unit 120 may include a cell region extraction unit for extracting suspected cell segments from the 3-D refractive index slide image, that is, a 3-D refractive index image of all of the blood smear specimens 101, a cell patch sampling unit for generating patches by sampling the extracted suspected cell segments, and an ROI determination unit for determining, as ROI patches, cells determined as abnormal cells.

The diagnosis unit 130 may determine the type of a cell in a non-dyeing and non-label manner by applying a deep learning algorithm based on the 3-D refractive index distribution measured by the 3-D refractive index cell imaging unit 110. More specifically, the diagnosis unit 130 may determine a sub-classification of a cancer cell, corresponding to each of the ROI patches, using a cancer cell sub-classification determination model constructed based on a deep learning algorithm, and may generate the hematologic malignancy diagnosis results 102 by gathering the sub-classification results of the ROI patches. In this case, the hematologic malignancy diagnosis and determination results 102 of the diagnosis unit 130 may include the number of cancer cells [e.g., a cell ratio (percentage, M/E ratio), cell faithfulness, and tumor burden] for each sub-classification.

In this case, the cancer cell sub-classification determination model may determine a sub-classification of a cancer cell corresponding to each ROI patch received as an input by merging the results of the deep learning algorithm to which the measured 3-D refractive index image has been input based on a probability.

Accordingly, a hematologic malignancy can be diagnosed rapidly and accurately without an additional process, such as dyeing or a label. In particular, a hematologic malignancy can be rapidly diagnosed by measuring the morphological characteristics of a cancer cell using a 3-D refractive index microscope without dyeing or a label and applying a deep learning algorithm for the sub-classification and diagnosis of a cancer cell based on the measured morphological characteristics. Furthermore, a hematologic malignancy can be diagnosed by determining a sub-type of a cancer cell using the measurement of the 3-D refractive index of a live cancer cell even without adding an immuno-expression type test or a genetic test.

The rapid and non-label diagnosis apparatus 100 for a hematologic malignancy using 3-D quantitative phase imaging and deep learning according to an embodiment is more specifically described below.

Figure 2A:
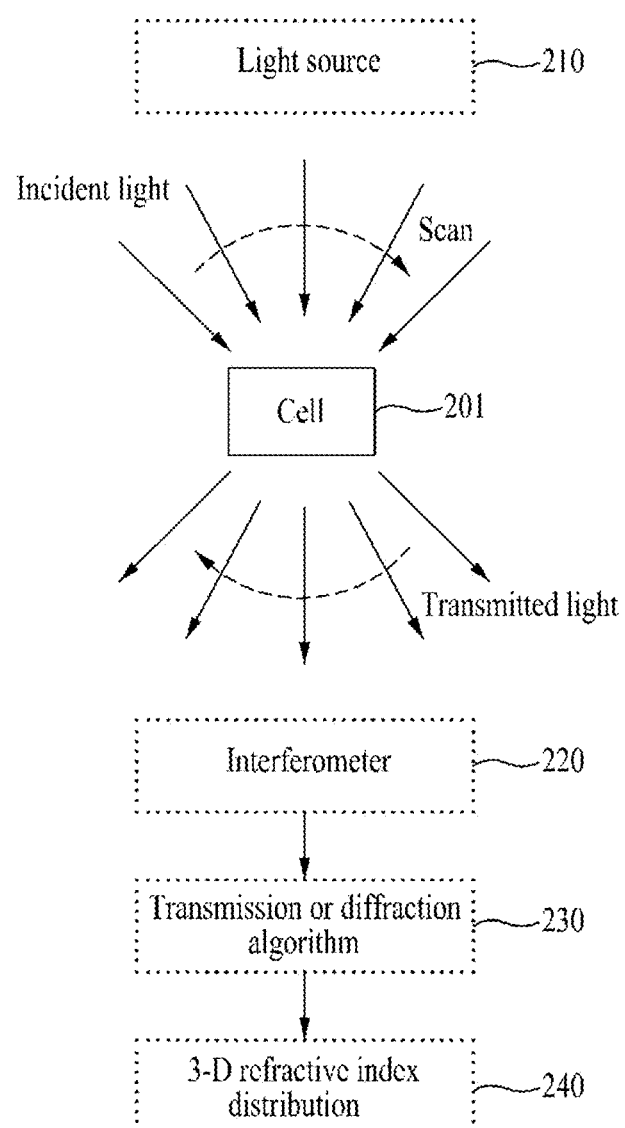
FIG. 2a is a diagram for describing a method of measuring a 3-D refractive index of a cell using an incident light rotation method according to an embodiment.

FIG. 2a is a diagram for describing a method of measuring a 3-D refractive index of a cell using an incident light rotation method according to an embodiment. Furthermore, FIG. 2b is a diagram for describing a method of measuring a 3-D refractive index of a cell using a cell rotation method according to an embodiment.

Figure 2B:
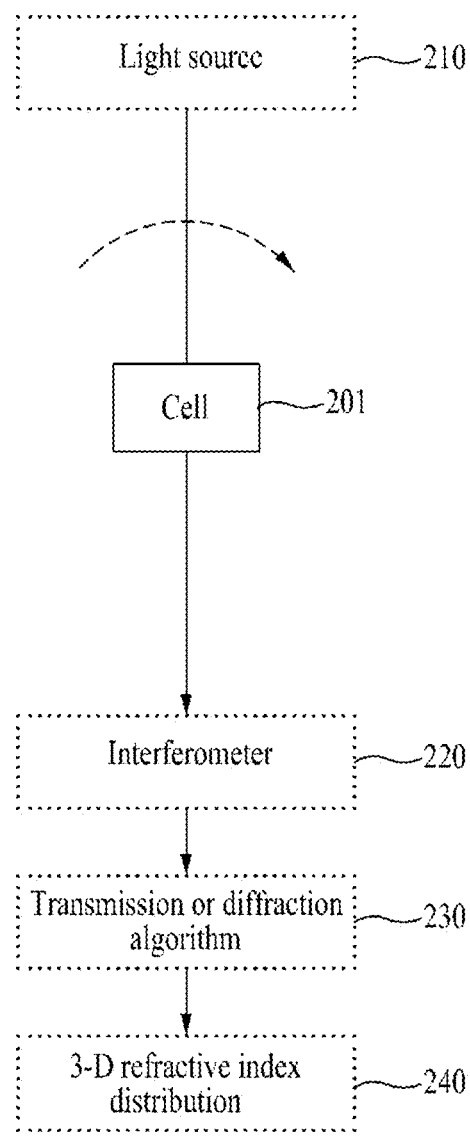
FIG. 2b is a diagram for describing a method of measuring a 3-D refractive index of a cell using a cell rotation method according to an embodiment.

FIGS. 2a and 2b illustrate various measurement optics implementations. Each of objects has a refractive index distribution. The refractive index is an optical physics unique to a material, which describes how much light is decelerated when passing through the material. In order to measure the 3-D refractive index of a cell 201, an optical diffraction tomography, an optical projection tomography, a tomographic phase microscopy or 3-D digital holographic microscopy may be used (Non-Patent Document 1). In this case, the cell 201 may mean a blood smear specimen.

As illustrated in FIG. 2a, an optical implementation, such as the optical diffraction tomography or the optical projection tomography, may be used (Non-Patent Document 2). After light emitted from a light source 210 is incident on the cell 201, the hologram of transmitted light diffracted from the cell 201 may be measured using an interferometer 220. In this case, a 3-D refractive index distribution of the cell 201 may be measured (240) using several sheets of 2-D holograms measured by rotating (or scanning) the angle of the light incident on the cell 201. In this case, a difference between the optical diffraction tomography or the optical projection tomography lies in a restoration algorithm 230 into which whether light is diffracted in a sample is taken into consideration.

Referring to FIG. 2b, instead of rotating the incident light in the method of measuring the 3-D refractive index distribution of the cell 201 using the incident light rotation method described with reference to FIG. 2a, the 3-D refractive index distribution may be measured (240) by directly rotating the cell 201.

The method of measuring the cell 201 may be performed in a form in which the cells 201 are placed on an in vitro slide glass at a low concentration, a form in which the cells 201 are formed on an in vitro slide glass as a single layer or several layers at a high concentration, a tissue slide form in which a living tissue slide is cut at a thickness of 5 micrometers to 50 micrometers, or a form in which the cell 201 passes through a microfluidic channel for high-throughput screening in the in vitro.

Figure 3:
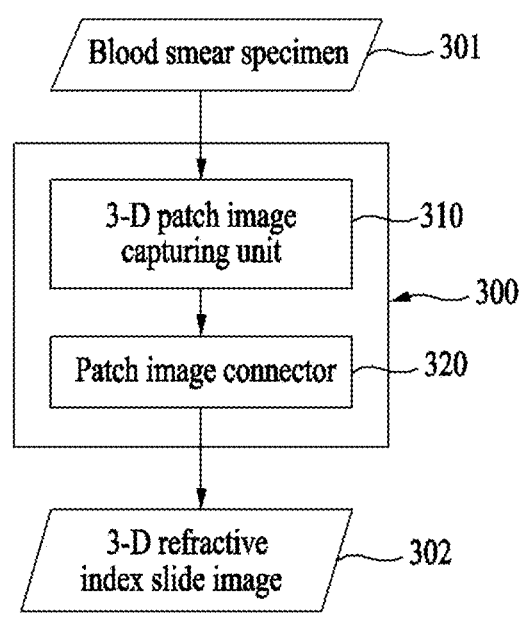
FIG. 3 is a diagram for describing a 3-D refractive index cell imaging unit according to an embodiment.

FIG. 3 is a diagram for describing a 3-D refractive index cell imaging unit according to an embodiment.

A 3-D refractive index image may be captured in the form of a blood smear specimen 301 in which blood of a patient has been smeared on a slide glass. Since the blood smear specimen 301 is larger than an area capable of being captured simultaneously, as illustrated in FIG. 3, a 3-D refractive index slide image 302 may be generated by connecting 3-D images that have been captured simultaneously.

The 3-D refractive index cell imaging unit 300 may include a 3-D patch image capturing unit 310 and a patch image connector 320. The 3-D patch image capturing unit 310 may capture 3-D refractive index images capable of being captured simultaneously in the form of the blood smear specimen 301 in which blood has been smeared on a slide glass. The patch image connector 320 may generate the 3-D refractive index slide image 302 by connecting the 3-D refractive index images captured simultaneously.

Figure 4:
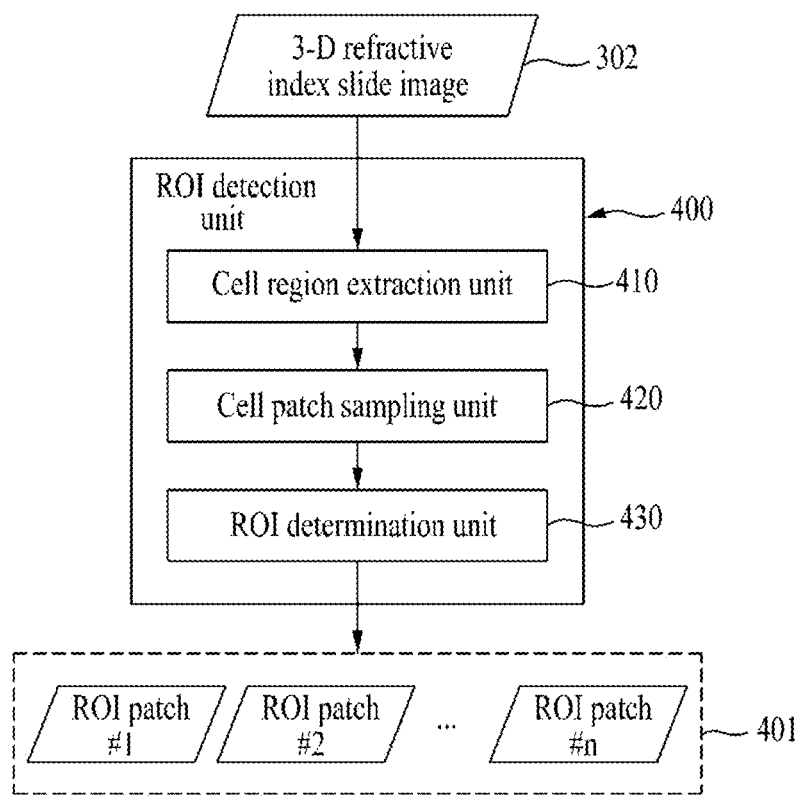
FIG. 4 is a diagram for describing an ROI detection unit according to an embodiment.

FIG. 4 is a diagram for describing an ROI detection unit 400 according to an embodiment.

Referring to FIG. 4, a slide image generated by the 3-D refractive index cell imaging unit 110 is a 3-D image of all blood smear specimens. In order to diagnose a hematologic malignancy, a ratio of the number of specific cancer cells and a cell in the blood smear specimen is important. To this end, the patch of the area of a suspected cell may be generated.

After the suspected cell segment is sampled, cells other than a normal cell, such as a red blood cell, may be determined as ROI patches 401.

The ROI detection unit 400 may include a cell region extraction unit 410, a cell patch sampling unit 420 and an ROI determination unit 430. The cell region extraction unit 410 may extract a suspected cell segment from the 3-D refractive index slide image 302. The cell patch sampling unit 420 may generate a patch by sampling the extracted suspected cell segment. Furthermore, the ROI determination unit 430 may determine, as the ROI patches 401, cells determined as abnormal cells.

Figure 5:
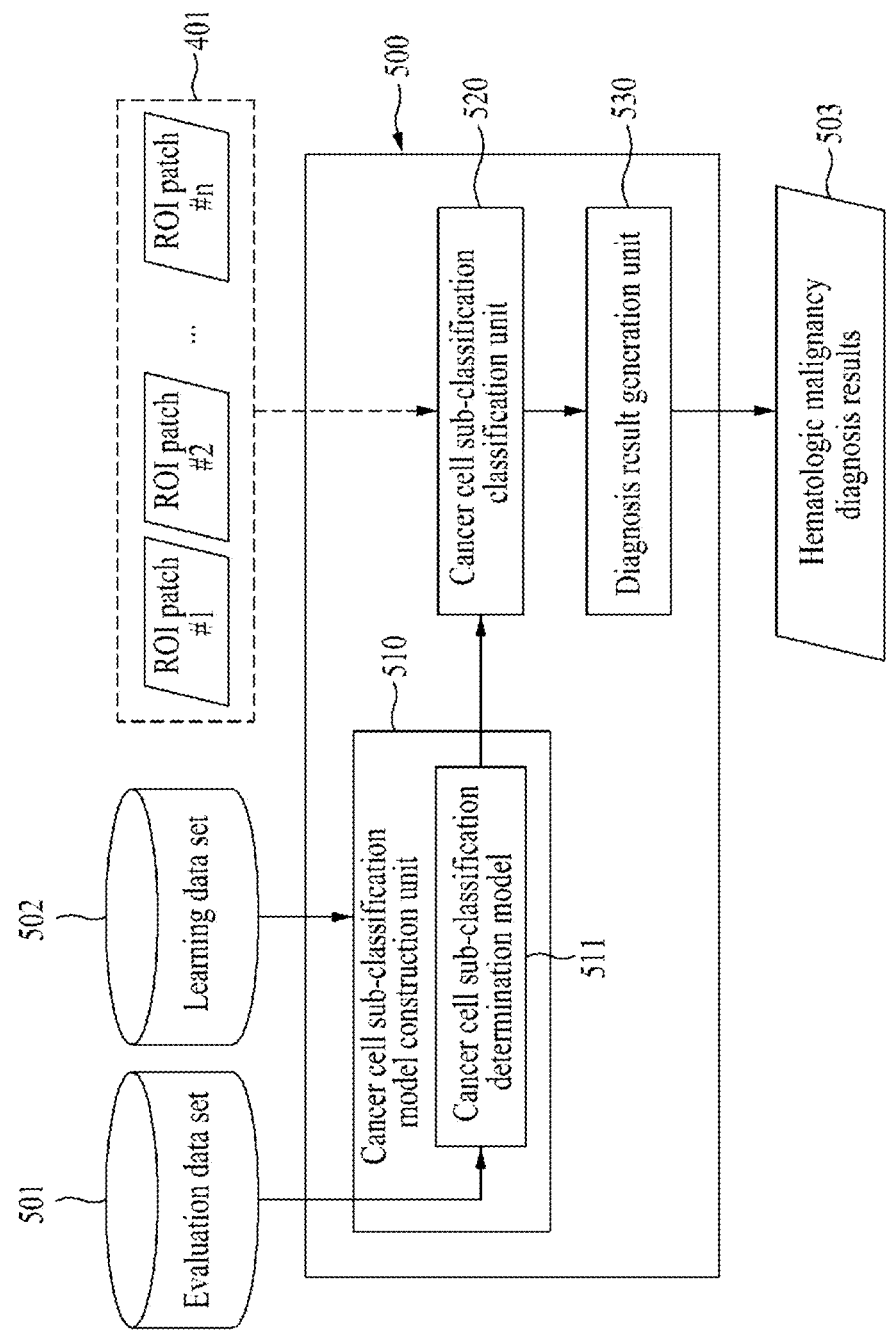
FIG. 5 is a diagram for describing a diagnosis unit according to an embodiment.

FIG. 5 is a diagram for describing a diagnosis unit 500 according to an embodiment.

Referring to FIG. 5, the type of cancer cell may be determined through deep learning using an evaluation data set 501 and a learning data set 502. The diagnosis unit 500 may measure a 3-D refractive index image of cancer cells whose types have already been determined using the method described in the 3-D refractive index cell imaging unit and the ROI detection unit.

In this case, a cancer cell sub-classification model construction unit 510 may measure a large number (>100) of samples for each type, and may construct a cancer cell sub-classification determination model 511 capable of determining each cancer cell sub-classification using a deep learning algorithm. The cancer cell sub-classification determination model 511 may measure a 3-D refractive index image of cancer cells whose types have already been determined, may measure the 3-D refractive index image including a preset number of cancer cells or more for each type, and may determine a sub-classification of each cancer cell through a deep learning algorithm using the measured 3-D refractive index image.

A cancer cell sub-classification classification unit 520 may determine a sub-classification of a cancer cell, corresponding to each of the ROI patch 401 extracted by the ROI detection unit, based on the cancer cell sub-classification determination model 511. The diagnosis result generation unit 530 may generate hematologic malignancy diagnosis results 503 by gathering the determined results. The hematologic malignancy diagnosis results 503 may include the number of cancer cells for each sub-classification.

Figure 6:
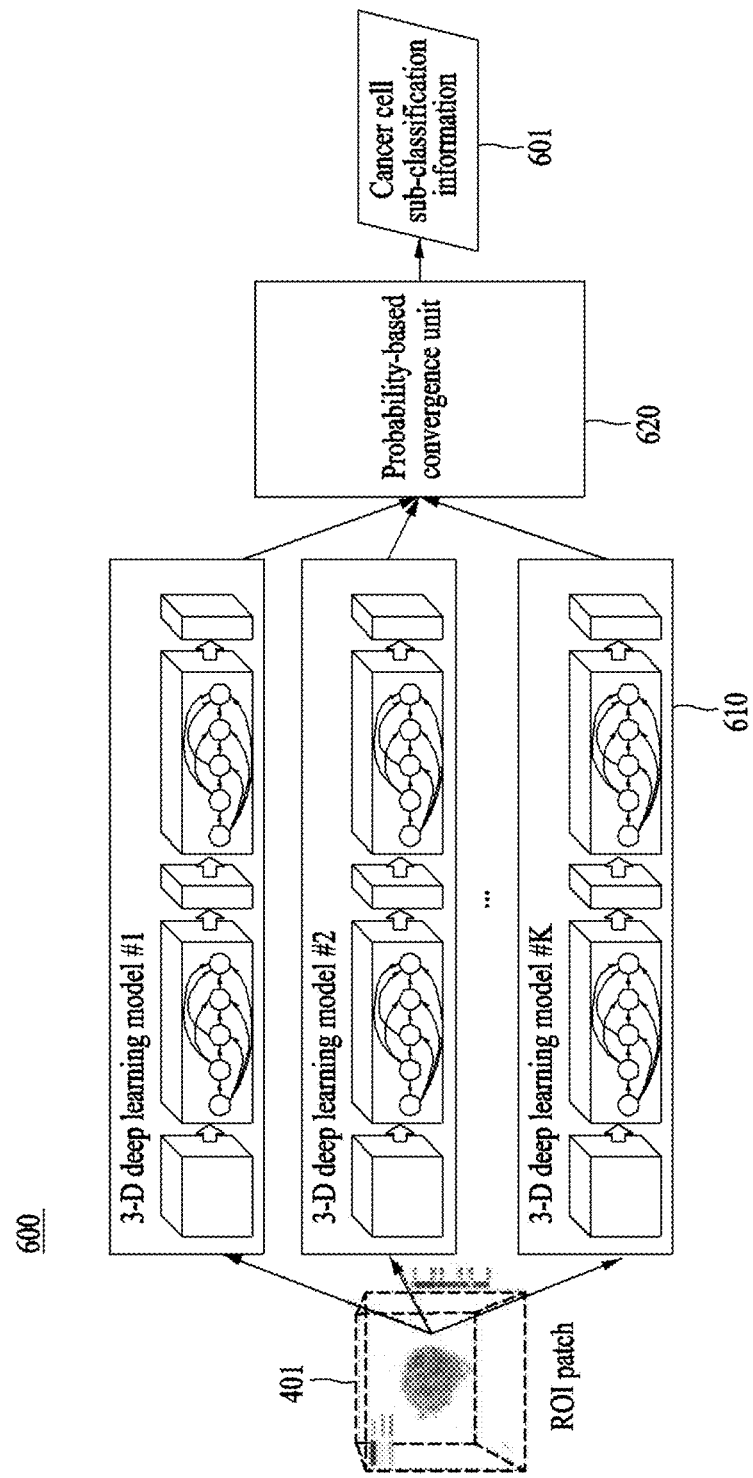
FIG. 6 is a diagram for describing a cancer cell sub-classification determination model according to an embodiment.

FIG. 6 is a diagram for describing a cancer cell sub-classification determination model 600 according to an embodiment.

Referring to FIG. 6, the cancer cell sub-classification determination model 600 may use a deep learning algorithm 610 based on measured 3-D refractive index information. In this case, information input to a neural network algorithm, that is, the deep learning algorithm 610, is 3-D refractive index information of each cell. A predictive value output as a result through the deep learning algorithm 610 is information on a sub-classification of a cancer cell corresponding to the ROI patch 401 received as an input.

In order to maintain stable prediction performance, one or more cancer cell subclassification models based on the deep learning algorithms 610 may be trained, and results thereof may be statistically merged by a probability-based convergence unit 620 and used for cancer cell sub-classification information 601. Accordingly, a predicted value robust against various deformations which may occur within a cancer cell sub-classification can be provided.

Figure 7:
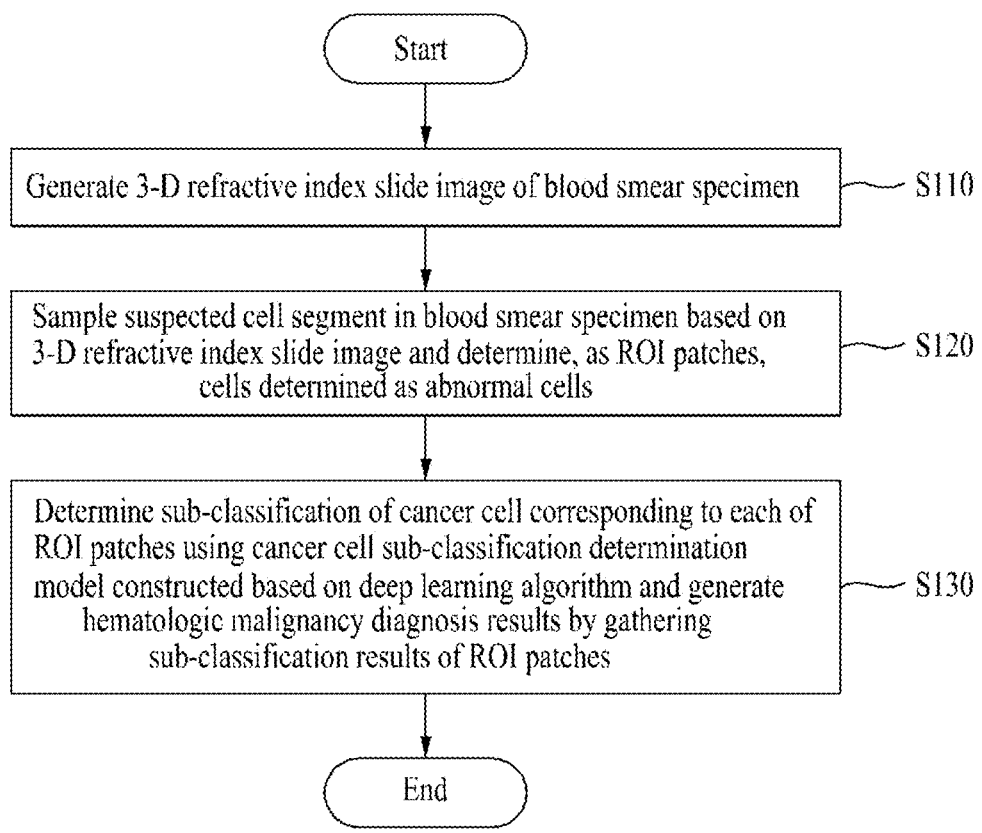
FIG. 7 is a flowchart for describing a rapid and non-label diagnosis method for a hematologic malignancy using 3-D quantitative phase imaging and deep learning according to an embodiment.

FIG. 7 is a flowchart for describing a rapid and non-label diagnosis method for a hematologic malignancy using 3-D quantitative phase imaging and deep learning according to an embodiment.

Referring to FIG. 7, the non-label diagnosis method for a hematologic malignancy using 3-D quantitative phase imaging and deep learning according to an embodiment may include the step S110 of generating a 3-D refractive index slide image of a blood smear specimen by capturing a 3-D refractive index image in the form of the blood smear specimen in which blood of a patient has been smeared on a slide glass, the step S120 of sampling a suspected cell segment in the blood smear specimen based on the 3-D refractive index slide image and then determining, as ROI patches, cells determined as abnormal cells, and the step S130 of determining a sub-classification of a cancer cell corresponding to each of the ROI patches using a cancer cell sub-classification determination model constructed based on a deep learning algorithm and generating hematologic malignancy diagnosis results by gathering the subclassification results of the ROI patches.

A non-label diagnosis method for a hematologic malignancy using 3-D quantitative phase imaging and deep learning according to an embodiment is more specifically described below by taking an example.

The non-label diagnosis method for a hematologic malignancy using 3-D quantitative phase imaging and deep learning according to an embodiment may be described using the non-label diagnosis apparatus for a hematologic malignancy using 3-D quantitative phase imaging and deep learning according to an embodiment, which has been described with reference to FIG. 1.

The rapid and non-label diagnosis apparatus 100 for a hematologic malignancy using 3-D quantitative phase imaging and deep learning according to an embodiment may include the 3-D refractive index cell imaging unit 110, the ROI detection unit 120, and the diagnosis unit 130.

At step S110, the 3-D refractive index cell imaging unit 110 may generate a 3-D refractive index slide image of the blood smear specimen 101 by capturing a 3-D refractive index image in the form of the blood smear specimen 101 in which blood of a patient has been smeared on a slide glass. More specifically, the 3-D refractive index cell imaging unit 110 may include the 3-D patch image capturing unit and the patch image connector. The 3-D patch image capturing unit may capture 3-D refractive index images capable of being captured simultaneously in the form of the blood smear specimen 101 in which the blood has been smeared on the slide glass. Thereafter, the patch image connector may generate the 3-D refractive index slide image by connecting the 3-D refractive index images captured simultaneously.

At step S120, the ROI detection unit 120 may sample a suspected cell segment in the blood smear specimen 101 based on the 3-D refractive index slide image, and may determine, as ROI patches, cells determined as abnormal cells. More specifically, the cell region extraction unit of the ROI detection unit 120 may extract the suspected cell segment from the 3-D refractive index slide image, that is, a 3-D refractive index image of all of the blood smear specimens 101. The cell patch sampling unit may generate a patch sampled from the extracted suspected cell segment. Thereafter, the ROI determination unit may determine, the ROI patches, cells determined as abnormal cells.

At step S130, the diagnosis unit 130 may determine the type of cell in a non-dyeing and non-label manner by applying a deep learning algorithm using a 3-D refractive index distribution measured by the 3-D refractive index cell imaging unit 110. More specifically, the diagnosis unit 130 may determine a sub-classification of a cancer cell, corresponding to each of the ROI patches, using a cancer cell sub-classification determination model constructed based on a deep learning algorithm, and may generate the hematologic malignancy diagnosis results 102 by gathering the sub-classification results of the ROI patches. In this case, the hematologic malignancy diagnosis results 102 of the diagnosis unit 130 may include the number of cancer cells for each sub-classification.

In this case, the cancer cell sub-classification determination model may determine a sub-classification of a cancer cell corresponding to each ROI patch received as an input by merging the results of the deep learning algorithm to which the measured 3-D refractive index image has been input based on a probability.

As described above, according to embodiments, rapid and consistent acute leukemia analysis and diagnosis results can be provided compared to the existing acute leukemia diagnosis technology. According to embodiments, a pre-treatment time for dyeing and a label is not necessary and analysis and diagnosis can be rapidly performed because the morphological characteristics of a cancer cell can be extracted without using dyeing and a label. Furthermore, consistent and stable analysis and diagnosis can be performed because they are not influenced by a subjective determination based on dyeing and a label. Accordingly, rapid treatment can be performed on acute leukemia whose symptom becomes worse very rapidly, the survival rate of acute leukemia patients can be significantly increased, and efficiency of a hospital system can be improved through cheap diagnosis costs and rapid diagnosis. Furthermore, according to embodiments, a hematologic malignancy including leukemia and lymphoma addition to acute leukemia can be rapidly analyzed and diagnosed.

The embodiments can provide the non-label diagnosis method and apparatus for a hematologic malignancy, wherein a subtype of a hematologic malignancy that requires rapid treatment is determined by determining a sub-type of a living cancer cell using the 3-D refractive index of the cancer cell even without using dyeing or a label and adding an immuno-expression type test. Furthermore, there can be provided the non-label method and apparatus for diagnosing a hematologic malignancy by determining a sub-type of a living cancer cell based on the measurement of 3-D refractive index of the cancer cell even without adding a genetic test.

The embodiments can provide the non-label method and apparatus for diagnosing a hematologic malignancy, which do not require a pre-treatment time for dyeing and a label and enable rapid analysis and diagnosis by extracting the morphological characteristics of a cancer cell without using dyeing and a label and are capable of consistent and stable analysis and diagnosis because the analysis and diagnosis are not influenced by a subjective determination based on dyeing and a label.

The aforementioned apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to an embodiment may be implemented in the form of program instructions executable by a variety of computer means, and may be stored in a computer-readable storage medium. The computer-readable storage medium may include program instructions, a data file, and a data structure alone or in combination. The program instructions stored in the medium may be specially designed and constructed for an embodiment, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions such as a ROM, a RAM, and a flash memory. Examples of the program instructions include not only machine language code that is constructed by a compiler but also high-level language code that can be executed by a computer using an interpreter or the like.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A non-label diagnosis apparatus for a hematologic malignancy using three-dimensional (3-D) quantitative phase imaging and deep learning, the apparatus comprising:
   a 3-D refractive index cell imaging unit configured to generate a 3-D refractive index slide image of a blood smear specimen by capturing a 3-D refractive index image of the blood smear specimen in which blood of a patient has been smeared on a slide glass or in which the 3-D refractive index slide image has a single layer or a plurality of layers on an in vitro slide glass;
   a region-of-interest (ROI) detection unit configured to sample a suspected cell segment in the blood smear specimen based on the 3-D refractive index slide image and to determine, as ROI patches, cells determined as abnormal cells; and
   a diagnosis unit configured to determine a sub-classification of a cancer cell corresponding to each of the ROI patches using a cancer cell sub-classification determination model constructed based on a deep learning algorithm and to generate hematologic malignancy diagnosis results by gathering sub-classification results of the ROI patches;
   wherein the 3-D refractive index cell imaging unit comprises a 3-D patch image capturing unit configured to simultaneously capture 3-D refractive index images of the blood smear specimen in which the blood has been smeared on the slide glass.

2. The apparatus of claim 1, further comprising:
   a light source configured to have light incident on the blood smear specimen;
   an interferometer configured to obtain multiple 2-D holograms by measuring transmitted light diffracted from the blood smear specimen; and
   a measurement unit configured to measure a 3-D refractive index distribution of the blood smear specimens using the multiple 2-D holograms,
   wherein the 3-D refractive index distribution of the blood smear specimens is measured using the multiple 2-D holograms, measured by the interferometer, by rotating an angle of the light incident on the blood smear specimens.

3. The apparatus of claim 1, further comprising:
   a light source configured to have light incident on the blood smear specimen;
   an interferometer configured to obtain multiple 2-D holograms by measuring transmitted light diffracted from the blood smear specimen; and
   a measurement unit configured to measure a 3-D refractive index distribution of the blood smear specimens using the multiple 2-D holograms,
   wherein the 3-D refractive index distribution of the blood smear specimens is measured using the multiple 2-D holograms, measured by the interferometer, by directly rotating the blood smear specimens.

4. The apparatus of claim 1, wherein the 3-D refractive index cell imaging unit further comprises:
   a patch image connector configured to generate the 3-D refractive index slide image by connecting the 3-D refractive index images captured.

5. The apparatus of claim 1, wherein the ROI detection unit comprises:
   a cell region extraction unit configured to extract the suspected cell segment from the 3-D refractive index slide image which is a 3-D refractive index image of all of the blood smear specimens;
   a cell patch sampling unit configured to generate a patch by sampling the extracted suspected cell segment; and
   an ROI determination unit configured to determine, as the ROI patches, the cells determined as the abnormal cells.

6. The apparatus of claim 1, wherein the diagnosis unit generates the hematologic malignancy diagnosis results comprising a number of cancer cells for each sub-classification by gathering sub-classification results of the ROI patches.

7. The apparatus of claim 1, wherein the cancer cell sub-classification determination model determines the subclassification of the cancer cell corresponding to each ROI patch by merging results of the deep learning algorithm to which the measured 3-D refractive index image has been input based on a probability.

8. A non-label diagnosis method for a hematologic malignancy using 3-D quantitative phase imaging and deep learning, the method comprising:

generating a 3-D refractive index slide image of a blood smear specimen by capturing a 3-D refractive index image of the blood smear specimen in which blood of a patient has been smeared on a slide glass or in which the 3-D refractive index slide image has a single layer or a plurality of layers on an in vitro slide glass;

sampling a suspected cell segment in the blood smear specimen based on the 3-D refractive index slide image and determining, as ROI patches, cells determined as abnormal cells; and determining a sub-classification of a cancer cell corresponding to each of the ROI patches using a cancer cell sub-classification determination model constructed based on a deep learning algorithm and generating hematologic malignancy diagnosis results by gathering sub-classification results of the ROI patches;

wherein generating the 3-D refractive index slide image of the blood smear specimen comprises simultaneously capturing 3-D refractive index images of the blood smear specimen in which the blood has been smeared on the slide glass.

9. The method of claim 8, wherein generating the 3-D refractive index slide image of the blood smear specimen further comprises:

generating the 3-D refractive index slide image by connecting the 3-D refractive index images captured.

10. The method of claim 8, wherein:

generating the hematologic malignancy diagnosis results by gathering the sub-classification results of the ROI patches comprises generating the hematologic malignancy diagnosis results comprising a number of cancer cells for each sub-classification by gathering sub-classification results of the ROI patches, and the cancer cell sub-classification determination model determines the sub-classification of the cancer cell corresponding to each ROI patch by merging results of the deep learning algorithm to which the measured 3-D refractive index image has been input based on a probability.

* * * * *